United States Patent
Wenstrup et al.

(10) Patent No.: US 7,521,386 B2
(45) Date of Patent: *Apr. 21, 2009

(54) MOLDABLE HEAT SHIELD

(75) Inventors: David Edward Wenstrup, Greer, SC (US); Gregory J. Thompson, Simpsonville, SC (US); Timothy Mitchell Meade, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 474 days.

This patent is subject to a terminal disclaimer.

(21) Appl. No.: 10/773,603

(22) Filed: Feb. 7, 2004

(65) Prior Publication Data

US 2005/0176327 A1 Aug. 11, 2005

(51) Int. Cl.
*B32B 5/26* (2006.01)
(52) U.S. Cl. .................. 442/389; 442/381; 442/383; 442/388; 442/392; 442/402; 442/415
(58) Field of Classification Search ............. 442/357, 442/235, 245, 333, 359, 360, 381, 384, 389, 442/409, 411, 414, 415, 383, 388, 392, 402; 428/424.7, 212, 218
See application file for complete search history.

(56) References Cited

U.S. PATENT DOCUMENTS

| | | | |
|---|---|---|---|
| 2,500,282 A | 3/1950 | Francis, Jr. .................. 154/101 |
| 2,543,101 A | 2/1951 | Francis, Jr. .................. 154/101 |
| 3,041,703 A | 7/1962 | Prell, III ....................... 26/51.5 |
| 3,073,735 A | 1/1963 | Till et al. ....................... 156/38 |
| 3,254,300 A | 5/1966 | Prell, III ........................ 324/68 |
| 3,688,804 A | 9/1972 | Brown et al. ................... 139/1 |
| 3,740,797 A | 6/1973 | Farrington ................. 19/156.3 |
| 3,772,739 A | 11/1973 | Lovgren ..................... 19/156.3 |
| 3,837,995 A | 9/1974 | Floden ....................... 161/150 |
| 4,018,646 A | 4/1977 | Ruffo et al. ................. 162/146 |

(Continued)

FOREIGN PATENT DOCUMENTS

DE 2125637 12/1971

(Continued)

OTHER PUBLICATIONS

Additives—Reinforcing Polypropylene with Natural Fibers. Plastics Engineering / Apr. 1994. Anand R. Sanadi—Department of Forestry, University of Wisconsin, Madison, Wisconsin. Daniel F. Caulfield and Roger M. Rowell, Forest Products Laboratory—U.S. Department of Agriculture, Madison, Wisconsin.

(Continued)

*Primary Examiner*—Andrew T Piziali
(74) *Attorney, Agent, or Firm*—Cheryl J. Brickey

(57) ABSTRACT

A moldable heat shield with a needled nonwoven core layer and needled nonwoven shell layers. The core layer has a blend polyester staple fibers and low melt polyester staple fibers. The shell layers have a blend of staple fibers of partially oxidized polyacrylonitrile, and staple fibers of polyester, and staple fibers of a low melt polyester. The layers are needled together such that fibers from the core layer do not reach the outer surfaces of the shell layers. The shell layers are calendared such that an outer surface layer is formed thereon, which provides the moldable heat shield with a water and oil resistant surface.

14 Claims, 2 Drawing Sheets

U.S. PATENT DOCUMENTS

| | | | |
|---|---|---|---|
| 4,082,886 A | 4/1978 | Butterworth et al. | 428/284 |
| 4,127,698 A | 11/1978 | Shimizu et al. | 428/373 |
| 4,194,037 A | 3/1980 | Stoller | 429/92 |
| 4,418,031 A | 11/1983 | Doerer et al. | 264/241 |
| 4,435,468 A | 3/1984 | TenEyck | 428/285 |
| 4,474,846 A | 10/1984 | Doerer et al. | 428/284 |
| 4,568,581 A | 2/1986 | Peoples, Jr. | 428/35 |
| 4,666,763 A | 5/1987 | King et al. | 428/221 |
| 4,714,647 A | 12/1987 | Shipp, Jr. et al. | 428/212 |
| 4,840,832 A | 6/1989 | Weinle et al. | 428/156 |
| 4,863,797 A | 9/1989 | Ichibori et al. | 428/359 |
| 4,931,357 A | 6/1990 | Marshall et al. | 442/415 |
| 4,970,111 A | 11/1990 | Smith, Jr. | 428/283 |
| 5,001,331 A | 3/1991 | Leestemaker | 235/375 |
| 5,039,431 A | 8/1991 | Johnson et al. | 264/113 |
| 5,079,074 A | 1/1992 | Steagall et al. | 428/218 |
| 5,108,678 A | 4/1992 | Hirasaka et al. | 264/113 |
| 5,141,805 A | 8/1992 | Nohara et al. | 428/296 |
| 5,147,345 A | 9/1992 | Young et al. | 604/378 |
| 5,173,355 A | 12/1992 | Vock et al. | 428/219 |
| 5,182,060 A | 1/1993 | Berecz | 264/70 |
| 5,200,128 A | 4/1993 | Kiss | 264/113 |
| 5,208,105 A | 5/1993 | Ichibori et al. | 428/373 |
| 5,348,796 A | 9/1994 | Ichibori et al. | 442/202 |
| 5,350,624 A | 9/1994 | Georger et al. | 429/219 |
| 5,399,423 A | 3/1995 | McCullough et al. | 428/287 |
| 5,407,739 A | 4/1995 | McCullough et al. | 428/287 |
| 5,409,573 A | 4/1995 | Weeks | 162/145 |
| 5,458,960 A | 10/1995 | Nieminen et al. | 428/284 |
| 5,508,102 A | 4/1996 | Georger et al. | 428/297 |
| 5,537,718 A | 7/1996 | Nagatsuka et al. | 19/302 |
| 5,558,832 A | 9/1996 | Noel et al. | 264/510 |
| 5,571,604 A | 11/1996 | Sprang et al. | 428/212 |
| 5,578,368 A | 11/1996 | Forsten et al. | 428/229 |
| 5,591,289 A | 1/1997 | Souders et al. | 156/148 |
| 5,614,285 A | 3/1997 | Gardill | 428/156 |
| 5,679,296 A | 10/1997 | Kelman et al. | 264/71 |
| 5,685,347 A | 11/1997 | Graham et al. | 139/390 |
| 5,698,298 A | 12/1997 | Jackson et al. | 428/198 |
| 5,723,209 A | 3/1998 | Borger et al. | 428/219 |
| 5,733,635 A | 3/1998 | Terakawa et al. | 428/198 |
| 5,766,745 A | 6/1998 | Smith et al. | 428/218 |
| 5,817,408 A | 10/1998 | Orimo et al. | 428/218 |
| 5,856,243 A * | 1/1999 | Geirhos et al. | 442/57 |
| 5,873,392 A | 2/1999 | Meyer et al. | 139/113 |
| 5,916,507 A | 6/1999 | Dabi et al. | 264/113 |
| 5,942,288 A | 8/1999 | Kajander | 427/389.7 |
| 6,063,461 A | 5/2000 | Hoyle et al. | 428/34.5 |
| 6,066,388 A | 5/2000 | Van Kerrebrouck | 428/218 |
| 6,074,505 A | 6/2000 | Ouellette et al. | 156/148 |
| 6,110,848 A | 8/2000 | Bouchette | 442/384 |
| 6,127,021 A | 10/2000 | Kelman | 428/172 |
| 6,177,370 B1 | 1/2001 | Skoog et al. | 442/387 |
| 6,204,207 B1 | 3/2001 | Cederblad et al. | 442/5 |
| 6,271,270 B1 | 8/2001 | Muzzy et al. | 521/48 |
| 6,322,658 B1 | 11/2001 | Byma et al. | 156/309.9 |
| 6,346,491 B1 | 2/2002 | DeAngelis et al. | 442/110 |
| 6,364,976 B2 | 4/2002 | Fletemier et al. | 156/62.2 |
| 6,475,315 B1 | 11/2002 | Kean et al. | 156/62.2 |
| 6,494,362 B1 | 12/2002 | Harmon | 235/375 |
| 6,572,723 B1 | 6/2003 | Tilton et al. | 156/148 |
| 6,582,639 B2 | 6/2003 | Nellis | 264/119 |
| 6,586,353 B1 | 7/2003 | Kiik et al. | 442/320 |
| 6,609,261 B1 | 8/2003 | Mortensen et al. | 5/698 |
| 6,610,904 B1 | 8/2003 | Thomas et al. | 604/383 |
| 6,689,242 B2 | 2/2004 | Bodaghi | 156/181 |
| 6,702,914 B2 | 3/2004 | North et al. | 156/228 |
| 6,718,583 B1 | 4/2004 | Diaz | 5/698 |
| 6,734,335 B1 | 5/2004 | Graef et al. | 604/365 |
| 6,736,915 B2 | 5/2004 | Gebreselassie et al. | 156/62.6 |
| 6,756,332 B2 | 6/2004 | Sandoe et al. | 442/344 |
| 6,764,971 B2 | 7/2004 | Kelly et al. | 442/408 |
| 6,774,068 B2 | 8/2004 | Park | 442/326 |
| 6,781,027 B2 | 8/2004 | Fenwick et al. | 604/365 |
| 6,797,653 B2 | 9/2004 | Fay | 442/85 |
| 6,823,458 B1 | 11/2004 | Lee et al. | 726/16 |
| 6,936,554 B1 | 8/2005 | Singer | 442/327 |
| 7,137,477 B2 | 11/2006 | Keller et al. | 181/286 |
| 2001/0037854 A1 | 11/2001 | Byma et al. | 156/309.9 |
| 2003/0087572 A1 | 5/2003 | Balthes et al. | 442/247 |
| 2003/0100239 A1* | 5/2003 | Gaffney et al. | 442/354 |
| 2003/0106560 A1 | 6/2003 | Griesbach et al. | 128/849 |
| 2003/0162461 A1 | 8/2003 | Balthes | 442/411 |
| 2003/0199216 A1 | 10/2003 | Gomez et al. | 442/327 |
| 2003/0200991 A1 | 10/2003 | Keck et al. | 134/6 |
| 2003/0224145 A1 | 12/2003 | Campion et al. | 428/171 |
| 2003/0224679 A1 | 12/2003 | Ahluwalia | 442/72 |
| 2003/0228460 A1 | 12/2003 | Ahluwalia | 428/315.5 |
| 2004/0023586 A1 | 2/2004 | Tilton | 442/381 |
| 2004/0060118 A1 | 4/2004 | Diaz | 5/698 |
| 2004/0060119 A1 | 4/2004 | Murphy et al. | 5/698 |
| 2004/0062912 A1 | 4/2004 | Mason et al. | 428/139 |
| 2004/0091705 A1 | 5/2004 | Hanyon et al. | 428/373 |
| 2004/0097159 A1 | 5/2004 | Balthes et al. | 442/415 |
| 2004/0102112 A1 | 5/2004 | McGuire et al. | 442/59 |
| 2004/0106347 A1 | 6/2004 | McGuire et al. | 442/361 |
| 2004/0158928 A1 | 8/2004 | Gladney | 5/698 |
| 2004/0185239 A1 | 9/2004 | Nakamura et al. | 428/292.4 |
| 2004/0185731 A1 | 9/2004 | McGuire | 442/141 |
| 2004/0198125 A1 | 10/2004 | Mater et al. | 442/394 |
| 2004/0235983 A1 | 11/2004 | Stadler et al. | 523/122 |
| 2004/0242107 A1 | 12/2004 | Collins | 442/403 |
| 2004/0242109 A9 | 12/2004 | Tilton et al. | 442/415 |
| 2004/0259451 A1 | 12/2004 | Paradis et al. | 442/381 |
| 2005/0020164 A1 | 1/2005 | Nakamura et al. | 442/181 |
| 2005/0023509 A1 | 2/2005 | Bascom et al. | 252/608 |
| 2005/0026527 A1 | 2/2005 | Schmidt et al. | 442/381 |
| 2005/0026528 A1 | 2/2005 | Forsten et al. | 442/414 |
| 2005/0148268 A1 | 7/2005 | Tai | 442/414 |
| 2005/0170726 A1 | 8/2005 | Brunson et al. | 442/327 |
| 2005/0170728 A1 | 8/2005 | Crainic | 442/327 |
| 2005/0176327 A1 | 8/2005 | Wenstrup et al. | 442/357 |
| 2006/0063458 A1 | 3/2006 | McGuire | 442/411 |
| 2006/0068675 A1 | 3/2006 | Handermann et al. | 442/415 |
| 2006/0099393 A1 | 5/2006 | Woodman et al. | 428/292.1 |
| 2006/0105661 A1 | 5/2006 | Steinbach | 442/327 |
| 2006/0111003 A1 | 5/2006 | Balthes | 442/327 |
| 2006/0178064 A1 | 8/2006 | Balthes et al. | 442/59 |
| 2006/0182940 A1 | 8/2006 | Cline | 428/292.1 |
| 2006/0252323 A1 | 11/2006 | Cline | 442/71 |
| 2006/0264142 A1* | 11/2006 | Wenstrup et al. | 442/415 |
| 2007/0042658 A1 | 2/2007 | Cline et al. | 442/136 |
| 2007/0042665 A1 | 2/2007 | Peng et al. | 442/389 |

FOREIGN PATENT DOCUMENTS

| | | |
|---|---|---|
| DE | 202 03 427 | 4/2003 |
| EP | 1456834 | 11/1976 |
| EP | 0393450 | 9/1993 |
| EP | 0622332 | 11/1994 |
| EP | 0622332 | 7/1998 |
| EP | 1195459 | 4/2002 |
| EP | 1195459 | 10/2002 |
| EP | 1300511 | 4/2003 |
| EP | 1300511 | 9/2003 |
| EP | 1400328 | 3/2004 |
| JP | 59186750 | 10/1984 |
| JP | 4163254 | 6/1992 |
| JP | 59192754 | 6/1992 |
| JP | 5213138 | 8/1993 |
| JP | 8060530 | 8/1993 |
| JP | 06200460 | 7/1994 |
| JP | 07040487 | 2/1995 |
| JP | 7040487 | 2/1995 |

| | | |
|---|---|---|
| JP | 08506148 | 2/1996 |
| JP | 08108439 | 4/1996 |
| JP | 08323903 | 12/1996 |
| JP | 09216303 | 8/1997 |
| JP | 092220784 | 8/1997 |
| JP | 09313832 | 12/1997 |
| JP | 10110371 | 4/1998 |
| JP | 10147191 | 6/1998 |
| JP | 10180023 | 7/1998 |
| JP | 10236204 | 9/1998 |
| JP | 10236205 | 9/1998 |
| JP | 10236238 | 9/1998 |
| JP | 10245760 | 9/1998 |
| JP | 1095060 | 10/1998 |
| JP | 11058571 | 3/1999 |
| JP | 11061616 | 3/1999 |
| JP | 11217756 | 8/1999 |
| JP | 11268596 | 10/1999 |
| JP | 2000/211417 | 8/2000 |
| JP | 2001/232708 | 8/2001 |
| JP | 2002/287767 | 8/2002 |
| JP | 2002/526296 | 8/2002 |
| JP | 2002227767 | 10/2002 |
| JP | 2003/305789 | 10/2003 |
| JP | 2004/217052 | 8/2004 |
| JP | 2004/524453 | 8/2004 |
| JP | 2004/346436 | 12/2004 |
| JP | 2004 353110 | 12/2004 |
| JP | 2004/360089 | 12/2004 |
| JP | 2005/053035 | 3/2005 |
| WO | WO 97/00989 | 1/1997 |
| WO | WO 97/00989 | 9/1997 |
| WO | WO 01/31131 | 3/2001 |
| WO | WO 01/31131 | 5/2001 |
| WO | WO 02/076630 | 10/2002 |
| WO | WO 03/023108 | 2/2003 |
| WO | WO 2005/001187 | 1/2005 |
| WO | WO 2005/066396 | 7/2005 |
| WO | WO 2005/110733 | 11/2005 |
| WO | WO 2006/083144 | 8/2006 |
| WO | WO 2006/091031 | 8/2006 |
| WO | WO 2006/124305 | 11/2006 |

OTHER PUBLICATIONS

1995 American Chemical Society. Ind. Eng. Chem. Res. 1995, 34, 1889-1896. Renewable Agricultural Fibers as Reinforcing Fillers in Plastics: Mechanical Properties of Kenaf Fiber-Polypropylene Composites. Anand R. Sanadi, Daniel F. Caulfield, Rodney E. Jacobson, and Roger M. Rowell. Department of Forestry, University of Wisconsin, 1630 Linden Drive, Madison, Wisconsin 53706, and Forest Products Laboratory, USDA, 1 Gifford Pinchot Drive, Madison, Wisconsin 53705.

National Renewable Energy Laboratory, Golden, Colorado, Proceedings—Second Biomass Conference of the Americas: Energy, Environment, Agriculture, and Industry. Aug. 21-24, 1995, Portland, Oregon.

Science and Technology of Polymers and Advanced Materials. Edited by P.N. Prasad et al., Plenum Press, New York, 1998. Property Enhanced Natural Fiber Composite Materials Based on Chemical Modification. Roger M. Rowell. USDA Forest Service, Forest Products Laboratory, One Gifford Pinchot Drive, Madison, WI 53705-2366 and Department of Biological Systems Engineering, University of Wisconsin, Madison, WI 63706.

Science and Technology of Polymers and Advanced Materials Edited by P.N. / Prasad et al., Plenum Press, New York, 1998. Economic Opportunities in Natural Fiber-Thermoplastic Composites. Roger M. Rowell. USDA Forest Products Laboratory, One Gifford Pinchot Drive, Madison, WI 53705-2366 and Department of Biological Systems Engineering, University of Wisconsin, Madison, WI 63706.

Plastics Technology Online Article—Natural Fibers: The New Fashion in Automotive Plastics—Oct. 1999. By Lilli Manolis Sherman, Senior Editor.

Blaga, A "Les thermoplastiques," Digests de la construction au Canada, Sep. 1975, Institut de la Recherche en Construction.

"Rieter Ultra Light™, A weight saving breakthrough in vehicle acoustics," Rieter Automotive Management AG 110.9e-AA-9/US, no date.

* cited by examiner

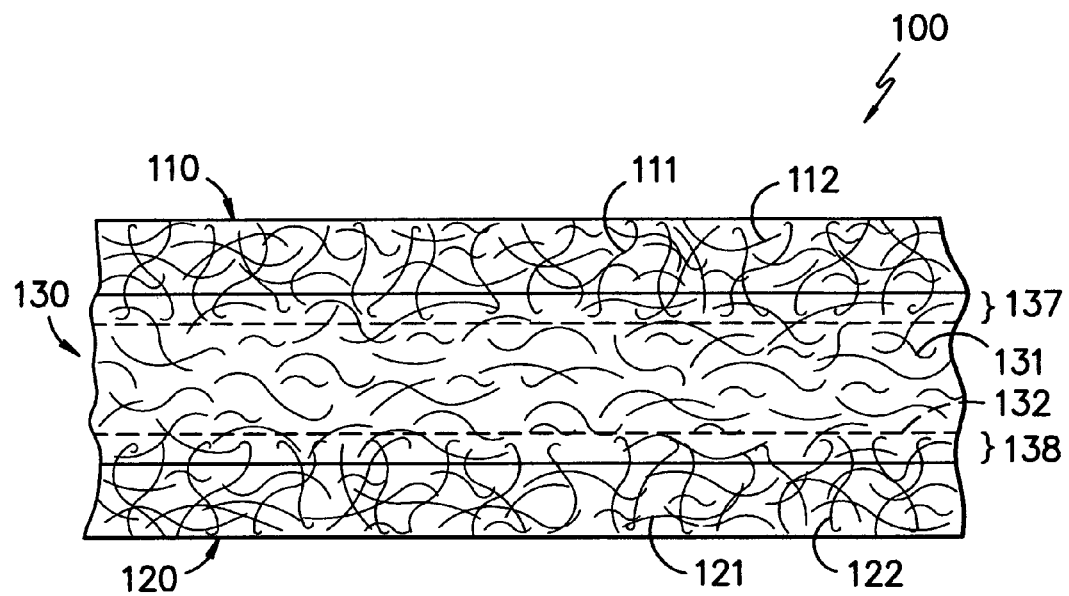
FIG. -1-
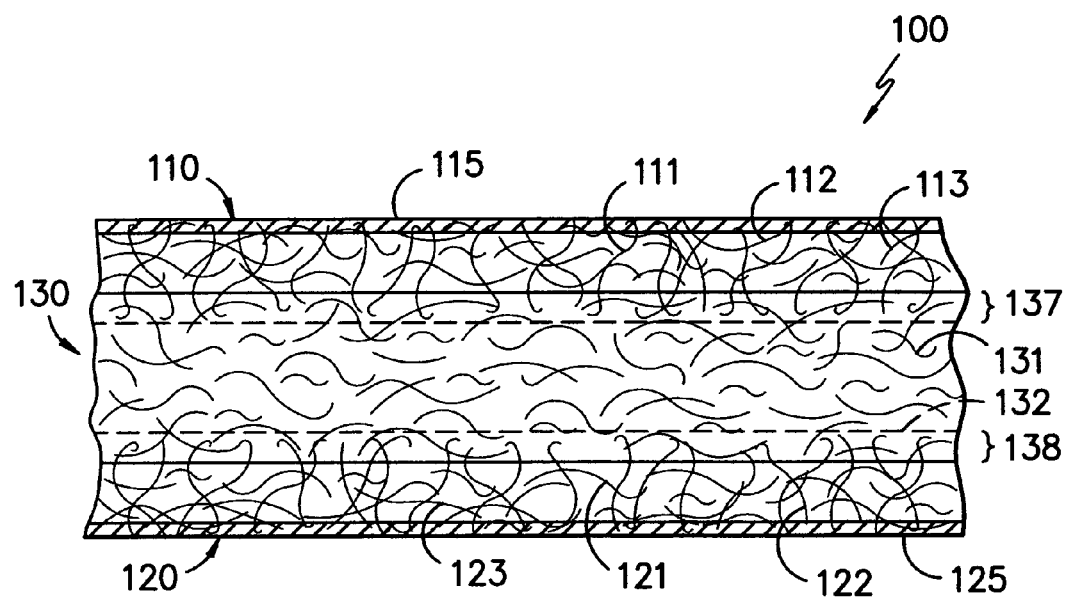
FIG. -2-

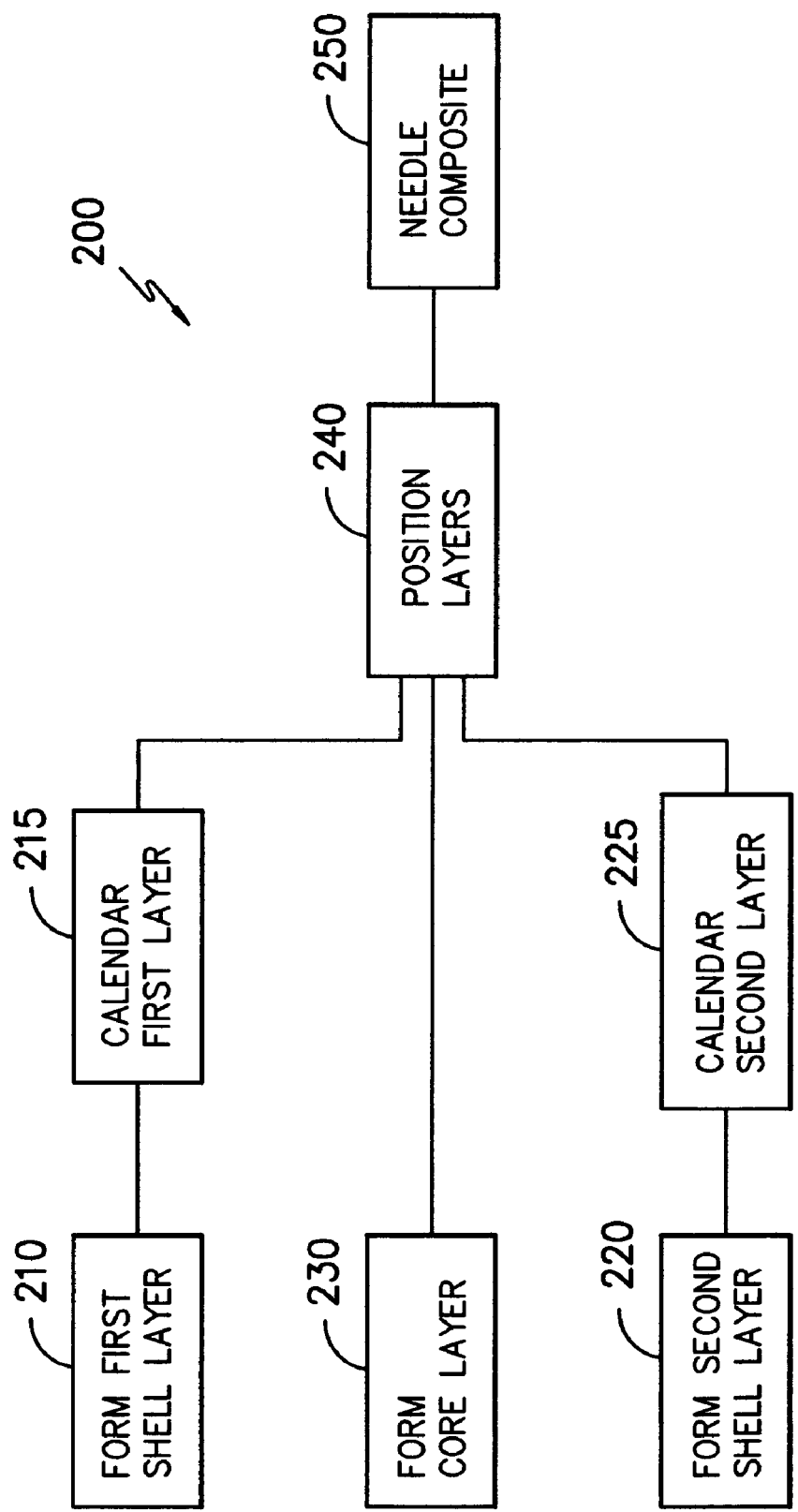
FIG. -3-

MOLDABLE HEAT SHIELD

BACKGROUND

The present invention generally relates to a moldable substrate which exhibits surface barrier properties as well as thermal and sound insulation properties.

The transportation industry currently uses moldable materials in a variety of applications which require both thermal and sound insulating performance features. In a number of applications the primary purpose of these materials is to act as a heat shield to vehicle components or occupants. Examples of heat shielding parts would include vehicle hood liners, firewall barriers, automotive transmission tunnel insulators, etc. Often a heat shield will have a moldable foam core, a resinated fiberglass core, a resinated cotton shoddy core, or other to give the shield volume and aid in the in absorption of heat and sound. The heat shield may also include a textile shell material enclosing the moldable core. The shell material gives the composite a desired aesthetic appearance and can provide an oil and water impermeable surface.

The present invention uses a blended synthetic fiber core to provide the heat shield with volume and moldability. A blend of common synthetic fibers and fibers of partially oxidized polyacrylonitrile are used to construct a low weight skin that is subsequently attached to the core on one or both sides. The invention has superior molding process performance, superior sound and heat absorptive performance, and the potential to be recycled. All of these benefits were achieved at competitive costs and weight to the existing products.

BRIEF DESCRIPTION OF THE DRAWINGS

These and other features, aspects, and advantages of the present invention will become better understood with regard to the following description, appended claims, and accompanying drawings where:

FIG. 1 shows an enlarged cross-section of a one embodiment of the present invention;

FIG. 2 shows an enlarged cross-sectional view of another embodiment of the present invention; and, FIG. 3 shows a block diagram of a process for forming the moldable heat shield in FIGS. 1 and 2.

DETAILED DESCRIPTION

Referring now to the figures, and in particular to FIGS. 1 and 2, there is shown an enlarged cross-sectional view of a moldable heat shield 100 illustrating an embodiment of the present invention. The moldable heat shield 100 generally includes a core 130 with a first shell layer 110 and a second shell layer 120. The first and second shell layers 110, 120, are from about 5% to about 50% of the total weight of the moldable heat shield 100.

Referring now to FIG. 1, the first and second shell layer 110, 120, are a nonwoven material of entangled blend of first shell fibers 111, 121, second shell fibers 112, 122, respectively. The first shell fibers 111, 121, are staple fibers of partially oxidized polyacrylonitrile (PAN). The second shell fibers 112, 122, are synthetic thermoplastic staple fibers. In a preferred embodiment, the second shell fibers 112, 122, are polyester. The first shell fibers 111, 121, are from about 25% to about 90% of the combined total weight of respective the first or second shell layer 110, 120.

In another embodiment illustrated in FIG. 2, the first and second outer shell layer 110, 120, also have an outer zone that the first shell fibers 111, 121, the second shell fibers 112,122, and third shell fibers 113, 123 have been fused to form an outer surface layer 115, 125, respectively. The third fibers are a synthetic thermoplastic polymer with a lower melting temperature than the second shell fibers 112, 122. In a preferred embodiment, the third shell fibers 113, 123, are a low melt polyester fiber. In this embodiment, the first fibers 111 can comprise from about 25% to about 90% of the total combined weight of the respective first or second shell layer 110, 120, and the third fibers 113, 123, can comprise from about 5% to about 40% of the total combined weight of the respective first or second shell layer 110, 120.

Still referring to FIG. 2, the outer surface layers 115,125, can provide water and oil repellency without the use of additional chemistries, such as fluorocarbons. The fusing of these fibers can commonly be done on a standard hot oil calendar. Typically the fibers are fused to a point to reduce the air permeability of the skin material to below 50 cfm at 125 pascals.

Referring now to FIGS. 1 and 2, the core 130 comprises a nonwoven of blended first and second core fibers 131 and 132. The first core fibers 131 are staple fibers of a thermoplastic polymer. In a preferred embodiment first core fibers 131 are polyester of denier 6 dpf or greater. In a further preferred embodiment first core fibers 131 are hollow-fill. The relative large denier and hollow-fill characteristics give the heat shield 100 volume and rebound for the molding process. The second core fibers 132 are lower melt temperature thermoplastic fibers, and provide the core 130 with moldable characteristics. The second core fibers 132 are from about 5% to about 40% of the total weight of the core layer 130. The second core fibers 132 can be selected to be the same polymeric material as used in first core fibers 131, with a lower melt temperature. Additionally, in the embodiment in FIG. 2, the first core fiber 131 can be chosen such that they are of the same polymeric material as second shell fibers 112, 122; and that second core fibers 132 are the same as third shell fibers 113 and 123. In this manner, the percent of partially oxidized polyacrylonitrile in the heat shield 100 is maintained at a low weight percent of the entire product, typically less than 10 percent, and the recyclability of the heat shield 100 is improved.

Referring now to FIGS. 1 and 2, the first and second shell layers 110, 120, are connected to the core 130 by the cross-entanglement of fibers from the respective layers. The core layer 130 has a first core layer entanglement zone 137 adjacent to the first shell layer 110, where fibers from the first shell layer 110 entangle with fibers in the core layer 130. The core layer 130 also has a second core layer entanglement zone 138 adjacent to the second shell layer 120, where fibers from the second shell layer 110 entangle with fibers in the core layer 130.

Referring now to FIG. 3, there is shown a block diagram illustrating one embodiment of a method for forming the moldable heat shield 100 in FIGS. 1 and 2. In the process illustrated in FIG. 3, the shell layers 110, 120 are formed in steps 210 and 220 as a needled nonwoven material with the appropriate blend and weight of fibers. In a preferred embodiment in which the outer surface of the shell materials are calendared, as previously described, the shell layers 110, 120, are calendared in steps 215 and 225 at a temperature above the melt temperature of the low melt shell thermoplastic fibers 113 and 123. In step 230, the core layer 130 is formed as a separate needled nonwoven material, with the appropriate blend and weight of core fibers 131 and 132. The nonwoven material of the shell layers 110, 120, are located on opposite surfaces of the core layer 130 in step 240. In step 250, the shell layers 110, 120, are joined to the core layer 130 by needling the composite from the outer surface of the shell layers 110, 120, into the core layer 130. During the needling in step 250, the needle stroke is set such that the barbs of the needles do not pass through the core layer 130 into the shell layer 110, 120, of the opposite side. This is done to prevent core fibers from reaching the outer surface of shell layers 110, 120. In another embodiment of steps 240 and 250, the shell layers 110, 120, can be bonded to the core layer 130 by placing an adhesive material between the core nonwoven mat and each shell nonwoven mat, and heating the collective shell nonwoven mats, core nonwoven mat, and adhesive to a temperature which activates the adhesive.

Although the present invention has been described in considerable detail with reference to certain preferred versions thereof, other versions are possible. Therefore, the spirit and scope of the appended claims should not be limited to the description of the preferred versions contained herein.

What is claimed is:

1. A moldable heat shield comprising a nonwoven composite of a core layer and outer shell layers adjoining the core layer, the core layer having entangled staple core fibers, the entangled core fibers comprising a blend of thermoplastic fibers and lower melting thermoplastic fibers, and the shell layers having entangled shell fibers, the entangled shell fibers comprising a blend of partially oxidized polyacrylonitrile staple fibers and thermoplastic staple fibers.

2. The moldable heat shield according to claim 1, wherein the core layer has an entanglement zone adjacent to the shell layers, within which shell fibers from the shell are entangled with core fibers from the core.

3. The moldable heat shield according to claim 1, wherein the thermoplastic staple fibers of the shell comprise polyester staple fibers.

4. The moldable heat shield according to claim 1, wherein the core fibers comprise polyester staple fibers.

5. The moldable heat shield according to claim 1, wherein the low melt core fibers comprise low melt polyester staple fibers.

6. The moldable heat shield according to claim 1, wherein the core fibers comprise hollow-fill fibers.

7. A moldable heat shield comprising a nonwoven composite of a core layer and outer shell layers adjoining the core layer, the core layer having entangled staple core fibers, the entangled core fibers comprising a blend of thermoplastic fibers and lower melting thermoplastic fibers, and the shell layers having entangled shell fibers, the entangled shell fibers comprising a blend of partially oxidized polyacrylonitrile staple fibers, thermoplastic staple fibers, and a lower melting thermoplastic staple fibers.

8. The moldable heat shield according to claim 7, wherein the core layer has an entanglement zone adjacent to the shell layers, within which shell fibers from the shell are entangled with core fibers from the core.

9. The moldable heat shield according to claim 7, wherein the thermoplastic staple fibers of the shell comprise polyester staple fibers.

10. The moldable heat shield according to claim 7, wherein the low melt thermoplastic staple fibers of the shell comprise low melt polyester staple fibers.

11. The moldable heat shield according to claim 7, wherein the core fibers comprise polyester staple fibers.

12. The moldable heat shield according to claim 7, wherein the low melt core fibers comprise low melt polyester staple fibers.

13. The moldable heat shield according to claim 7, wherein the core fibers comprise hollow-fill fibers.

14. The moldable heat shield according to claim 7, wherein the outer shell layers have an outer surface of fused shell fibers.

* * * * *